(12) United States Patent
Alldredge

(10) Patent No.: US 12,275,445 B2
(45) Date of Patent: Apr. 15, 2025

(54) COMBINATION MUCK BUCKET AND REVERSIBLE STAIRCASE AND METHODS OF USE

(71) Applicant: Alldredge Innovative Products, LLC, White, GA (US)

(72) Inventor: Rodney H. Alldredge, Peachtree Corners, GA (US)

(73) Assignee: Alldredge Innovative Products, LLC., White, GA (US)

( * ) Notice: Subject to any disclaimer, the term of this patent is extended or adjusted under 35 U.S.C. 154(b) by 599 days.

(21) Appl. No.: 17/708,083

(22) Filed: Mar. 30, 2022

(65) Prior Publication Data

US 2022/0371638 A1 Nov. 24, 2022

Related U.S. Application Data

(60) Provisional application No. 63/190,911, filed on May 20, 2021.

(51) Int. Cl.
*B62B 1/20* (2006.01)
*B62B 1/00* (2006.01)
*E06C 5/02* (2006.01)

(52) U.S. Cl.
CPC ............... *B62B 1/20* (2013.01); *B62B 1/008* (2013.01); *E06C 5/02* (2013.01)

(58) Field of Classification Search
CPC .. B62B 1/008; B62B 1/04; B62B 1/20; B62B 1/24; B62B 1/204; A47C 13/00
See application file for complete search history.

(56) References Cited

U.S. PATENT DOCUMENTS

| 2,622,658 | A | * | 12/1952 | Morgan | A47C 12/02 |
| | | | | | 182/35 |
| 3,407,899 | A | | 10/1968 | Delafrange | |
| 4,258,826 | A | | 3/1981 | Murray | |
| 4,494,626 | A | * | 1/1985 | Ast | B62B 1/10 |
| | | | | | 182/20 |
| 4,575,109 | A | * | 3/1986 | Cowdery | A45C 7/00 |
| | | | | | 280/37 |
| 4,607,856 | A | * | 8/1986 | Saleeba | B62B 1/20 |
| | | | | | D34/24 |
| 5,228,706 | A | * | 7/1993 | Boville | A45C 5/146 |
| | | | | | 280/30 |

(Continued)

*Primary Examiner* — Jeffrey J Restifo
(74) *Attorney, Agent, or Firm* — Mathew L. Grell, Esq.; Grell & Watson Patent Attorneys LLC

(57) ABSTRACT

A cart and reversible staircase having a muck bucket with open top formed from sidewalls and a bottom, where the bottom configured as a plurality of steps when inverted, wheeled rack assembly having a perimeter rail to support a rim of the muck bucket, a pair of hinged legs, each of the pair of hinged legs hingedly affixed to the support rim on opposite side rails to support the muck bucket in an upright position, a pair of hinged wheels hingedly affixed to opposite side rails to transport the muck bucket in an upright position, and each of the pair of hinged wheels linked to the pair of hinged legs to retract the hinged legs and wheels when the muck bucket in an inverted position, and, thus, functions to efficiently collect, transport, and remove muck and manure and also serve as a secure and safe staircase for mounting riding animals.

21 Claims, 10 Drawing Sheets

(56) References Cited

U.S. PATENT DOCUMENTS

| | | | | | |
|---|---|---|---|---|---|
| 5,373,708 | A | * | 12/1994 | Dumoulin, Jr. | A45C 11/20 62/331 |
| 5,458,395 | A | * | 10/1995 | Skarda, Jr. | A47C 7/622 297/188.1 |
| 5,649,718 | A | * | 7/1997 | Groglio | B62B 5/0003 414/498 |
| 5,715,910 | A | * | 2/1998 | Koch | E06C 7/426 182/33 |
| 6,186,522 | B1 | * | 2/2001 | Weis | A45C 13/262 280/DIG. 8 |
| 6,769,701 | B1 | * | 8/2004 | Clausen | B60B 33/0063 280/DIG. 3 |
| 6,802,515 | B2 | * | 10/2004 | Sorenson | B62B 1/12 280/DIG. 6 |
| 6,880,835 | B2 | * | 4/2005 | Tornabene | B62B 1/26 182/20 |
| 7,252,295 | B2 | * | 8/2007 | Bludworth | B62B 7/02 280/47.26 |
| 7,487,859 | B2 | * | 2/2009 | Wang | E06C 1/20 182/20 |
| 8,297,628 | B2 | * | 10/2012 | Zak | A47K 11/02 280/638 |
| 9,415,785 | B2 | * | 8/2016 | Cooke | B62B 1/18 |
| 2022/0371638 | A1 | * | 11/2022 | Alldredge | B62B 1/20 |

* cited by examiner

COMBINATION MUCK BUCKET AND REVERSIBLE STAIRCASE AND METHODS OF USE

CROSS-REFERENCE TO RELATED APPLICATIONS

To the full extent permitted by law, the present United States Non-provisional Patent Application hereby claims priority to and the full benefit of, U.S. Provisional Application No. 63/190,911, filed on May 20, 2021, entitled "MUCK BUCKET-STAIRS APPARATUS AND METHODS OF USE", which is incorporated by reference herein in its entirety.

FIELD OF THE DISCLOSURE

The present disclosure is directed to a cart. More specifically, the present disclosure is directed to a combination of a muck cart for the collection, transport, and removal of farm animals manure, hay feed, straw, tac and the like and reversible to a staircase to provide a safe means to mount a riding animal.

BACKGROUND

In barns and equestrian farms, it is labor intensive for farmers and ranchers of riding animals to collect, transport, and remove muck and manure. One approach to farm animal muck and manure removal is to use wheeled carts, wagons, and wheel barrels to collect, transport, and remove muck and manure.

An inherent problem with animal riders mounting riding animals is that frequently the animal rider is young, short, does not possess the flexibility to raise one foot high enough to reach the saddle stirrup while standing on the ground, or lacks the required upper body strength to quickly mount a riding animal which makes mounting very dangerous. One approach to safe means for mounting riding animals is to utilize a separate staircase or fence rail, which the rider has to move the riding animal to and position the riding animal next to the staircase or fence rail in order to step up the stairs case or fence rail to mount the riding animal.

In the past has been necessary to carry both a manure bucket (muck bucket) and in many cases a step for mounting a horse to equestrian sporting events.

Although there has been some prior art development in the field of convertible carts into other useful structures such as stepladders or seats which can be used to step up to another level, there has been no combination of a transport cart to collect, transport, and remove muck and manure wherein the cart could also serve as a secure and safe staircase for mounting a riding animal and enable the wheels of the cart to be lowered below the last step so as to provide a safe mounting platform.

Therefore, it is readily apparent that there is a recognizable unmet need for combination muck bucket and reversible staircase and methods of use that may be configured to address at least some aspects of the problems discussed above common to farm animal manure cleanup and vertical mounting difficulties of riding animals.

SUMMARY

Briefly described, in an example embodiment, the present disclosure may overcome the above-mentioned disadvantages and may meet the recognized need for a combination muck bucket and reversible staircase and methods of use to provide a combination cart and reversible staircase having a muck bucket with an open top formed from sidewalls and a bottom, where the bottom is configured as a plurality of steps when inverted, a pair of hinged legs, each of the pair of hinged legs removeably affixed to an opposite sidewall to support the muck bucket in an upright position, a pair of hinged wheels affixed to an opposite sidewall to transport the muck bucket in an upright position, and each of the pair of hinged wheels linked to the pair of hinged legs to retract the hinged legs and wheels when the muck bucket in an inverted position and, thus, functions to efficiently collect, transport, and remove muck and manure and also serve as a secure and safe staircase for mounting a riding animal.

In an another example embodiment, the present disclosure may overcome the above-mentioned disadvantages and may meet the recognized need for a combination muck bucket and reversible staircase and methods of use to provide a combination cart and reversible staircase having a muck bucket with an open top formed from sidewalls and a bottom, where the bottom is configured as a plurality of steps when inverted, wheeled rack assembly having a perimeter rail to support a rim of the muck bucket, a pair of hinged legs, each of the pair of hinged legs hingedly affixed to the support rim on opposite side rails to support the muck bucket in an upright position, a pair of hinged wheels hingedly affixed to opposite side rails to transport the muck bucket in an upright position, and each of the pair of hinged wheels linked to the pair of hinged legs to retract the hinged legs and wheels when the muck bucket in an inverted position and, thus, functions to efficiently collect, transport, and remove muck and manure and also serve as a secure and safe staircase for mounting a riding animal.

Accordingly, in one aspect, the present disclosure saves time, money, and enables efficiently collect, transport, and remove muck and manure via a muck bucket with retractable wheels on the cart to prevent accidentally stepping on them to enable a secure and safe staircase upper platform for mounting a riding animal.

Accordingly, in another aspect, the present disclosure saves time, money, and enables efficiently collect, transport, and remove muck and manure via a muck bucket with the wheels mounted three inches outside the sides of the cart to prevent accidentally stepping on them to enable a secure and safe staircase upper platform for mounting a riding animal.

Accordingly, in another aspect, the present disclosure saves time, money, and enables the muck bucket in an inverted position to be configured and used as a secure and safe staircase wheel free upper platform for mounting a riding animal.

Accordingly, in another aspect, the present disclosure saves time, money, and enables combination product having both functions of a muck bucket to collect, transport, and remove muck and manure and in an inverted position to be used as a secure and safe wheel free staircase with upper platform for mounting a riding animal.

Accordingly, in another aspect, the present disclosure provides a wheeled container with an open top, wherein the exterior of the container includes a planar front end surface, a bottom surface with as a 3 step or tiered set of horizontal and vertical surfaces (one, two, and three steps), a pair of wheels affixed proximate a transition between front end surface and third step horizontal surface, an extendable or pivotable leg support system affixed to second step vertical surface or exterior to hingedly or pivotably fold and retract the pair of wheels to prevent accidentally stepping on them.

In an exemplary embodiment of a combination muck bucket and reversible staircase may include a load carrying container having and open top formed from sidewalls, a back wall and a bottom, the bottom configured as a plurality of steps, a pair of legs, each the pair of legs pivotably affixed to the sidewalls to support the container in an upright position; and a pair of wheels, each of the pair of wheels pivotably affixed to the sidewalls to transport the container in an upright position, the pair of wheels connected to the pair of legs by a linkage arm, wherein a pivot motion of the pair of legs moves the pair of wheels between an extended wheel position and a retracted wheel position.

In another exemplary embodiment of an alternate a combination muck bucket and reversible staircase may include a load carrying container having and open top formed from sidewalls, a back wall and a bottom, the bottom configured as a plurality of steps, a cart, the cart having horizontal perimeter frame, a pair of legs, each the pair of legs pivotably affixed to one side of the horizontal perimeter frame, a pair of wheels, each of the pair of wheels affixed to a wheel support arm, the wheel support arm pivotably affixed to the horizontal perimeter frame via a pivot pin, and an linkage arm connected to proximate a midsection of each of the pair of legs and proximate a midsection of the wheel support arm, wherein a pivot motion of the pair of legs moves the linkage arm and the wheel support arm to move the pair of wheels between an extended wheel position and a retracted wheel position.

A feature of the present disclosure may include a combination container type wheeled cart for use by farmers, ranchers, and equestrian users to load or shovel material, such as feed, hay, straw, wood chips, manure, tac and the like to move or transport same via wheeled cart.

A feature of the present disclosure may include a combination container type wheeled cart that when turned upside down or inverted would become a step stool or staircase shaped to provide a tiered staircase which may include an uppermost platform and one or more steps.

A feature of the present disclosure may include a include a combination container type wheeled cart that when turned upside down would become a step stool or staircase with pivotably shiftable wheel assembly so as to be set aside when the cart is inverted for use as a staircase.

A feature of the present disclosure may include a combination container type wheeled cart that when turned upside down would become a step stool or staircase utilized adjacent a riding animal to form a staircase to provide a secure and safe wheel free staircase with upper platform for mounting and assisting disembarkation of a riding animal.

A feature of the present disclosure may include a combination container type wheeled cart that when turned upside down would become a step stool or staircase to provide two functions in a single item which saves critical trailer space when traveling.

A feature of the present disclosure may include a combination container type wheeled cart that when turned upside down would become a step stool or staircase to allow easy movement of a normally heavy mounting block by utilizing the manure cart mode to transport the staircase until the unit is in the desired location.

A feature of the present disclosure may include a combination container type wheeled cart that when turned upside down would become a step stool or staircase is its ability to help prevent unsafe conditions when sport participants are tempted to use mounting block or bucket to mount a riding animal.

These and other features of the combination muck bucket and reversible staircase and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present a combination muck bucket and reversible staircase and methods of use will be better understood by reading the Detailed Description of the Preferred and Selected Alternate Embodiments with reference to the accompanying drawing Figures, in which like reference numerals denote similar structure and refer to like elements throughout, and in which.

Figure 1:
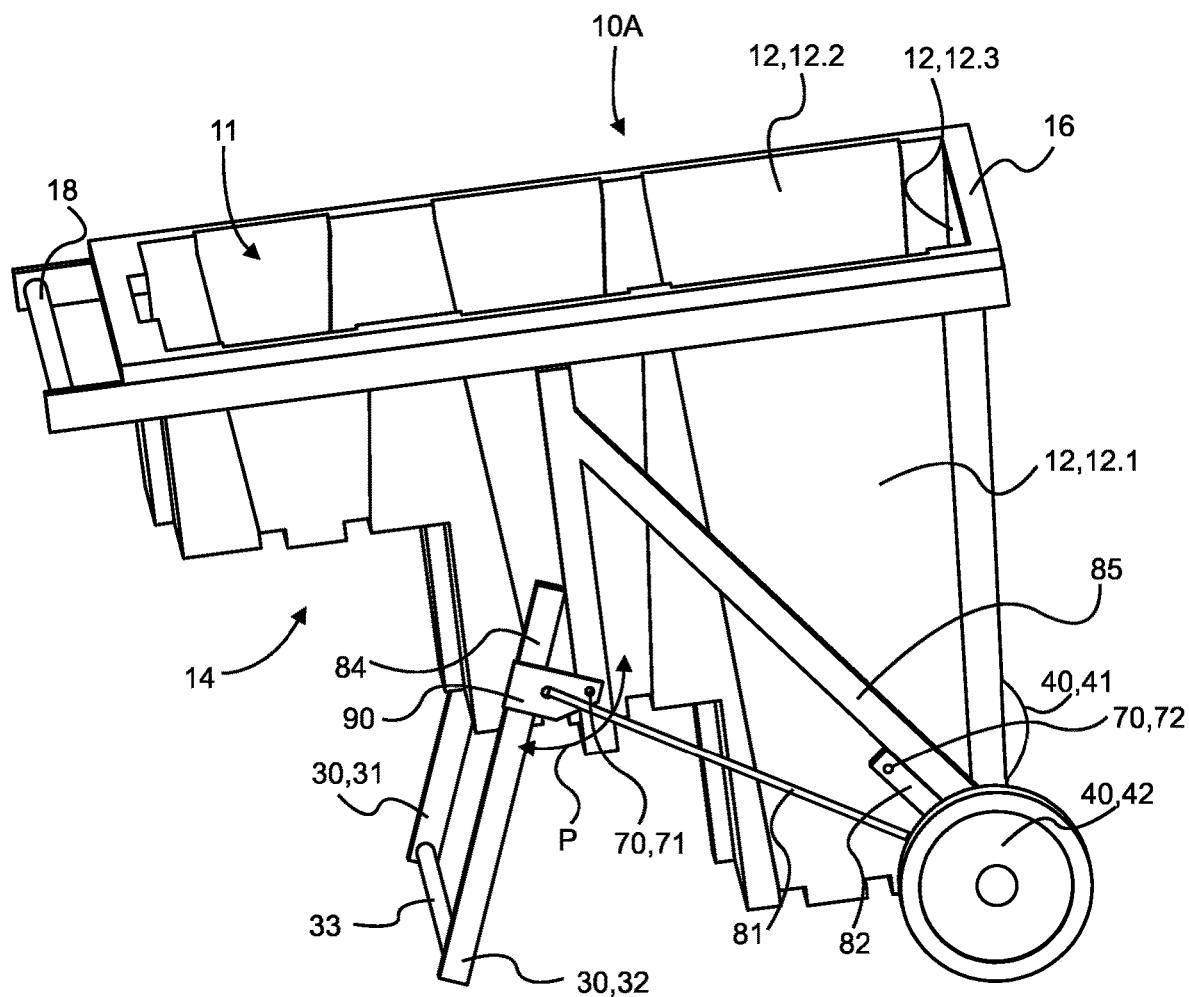
FIG. 1 is a perspective view of an exemplary embodiment of an upright position muck bucket and reversible staircase according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It is recognized herein that the optimum dimensional relationships, to include variations in size, materials, shape, form, position, connection, function and manner of operation, assembly and use, are intended to be encompassed by the present disclosure.

This disclosure allows two common items required in equine sports, a manure bucket, used for clearing horse stall and mounting step, used for assistance in mounting the horse. This combination is accomplished by engineering a single item so that it can be used safely for both functions by simply inverting the device and operating a mechanical lever to convert to the alternate use.

Referring now to FIGS. 1, 2, 3 and 4, by way of example, and not limitation, there is illustrated an example embodiment of combination apparatus, such as muck bucket and reversible staircase (riding animal steps or horse boarding steps) 10 and its parts, according to select embodiments. In this first embodiment, muck bucket and reversible staircase 10 may include a load carrying body, housing, or container having sidewalls 12, such as first sidewall 12.1, second sidewall 12.2, third sidewall (or back wall) 12.3, and bottom 14 coextensive and integrally formed as a unit to be used to efficiently collect, transport, and remove muck and manure, or the material, such as straw, hay, feed, and tackle. It is contemplated herein that muck bucket and reversible staircase 10 may be formed of one or more wells or containers. Sidewalls 12 may include outwardly extending flange, such as perimeter rim 16 therearound to form opening, such as aperture 11, wherein user U may deposit muck and manure, or the like for transport by muck bucket and reversible staircase 10. It is contemplated herein that perimeter rim 16 may form substantially planar support surface which can be used for stability when muck bucket and reversible staircase 10 is in an inverted orientation. Inverted muck bucket and reversible staircase 10 may have bottom 14, which may be configured or shaped with one or more steps formed therein, such as first step 21, second step 22, and third step 23 for use when muck bucket and reversible staircase 10 is inverted for use as a secure and safe staircase for a rider to mount a riding animal. It is contemplated herein that first step 21, second step 22, and third step (last step) 23 may include tread or slip resistant surface, such as grooves 25. Handle 18 may be positioned proximate first step 21 and/or rim 16 to enable user U to steer or guide and push or pull muck bucket and reversible staircase 10.

Figure 3:
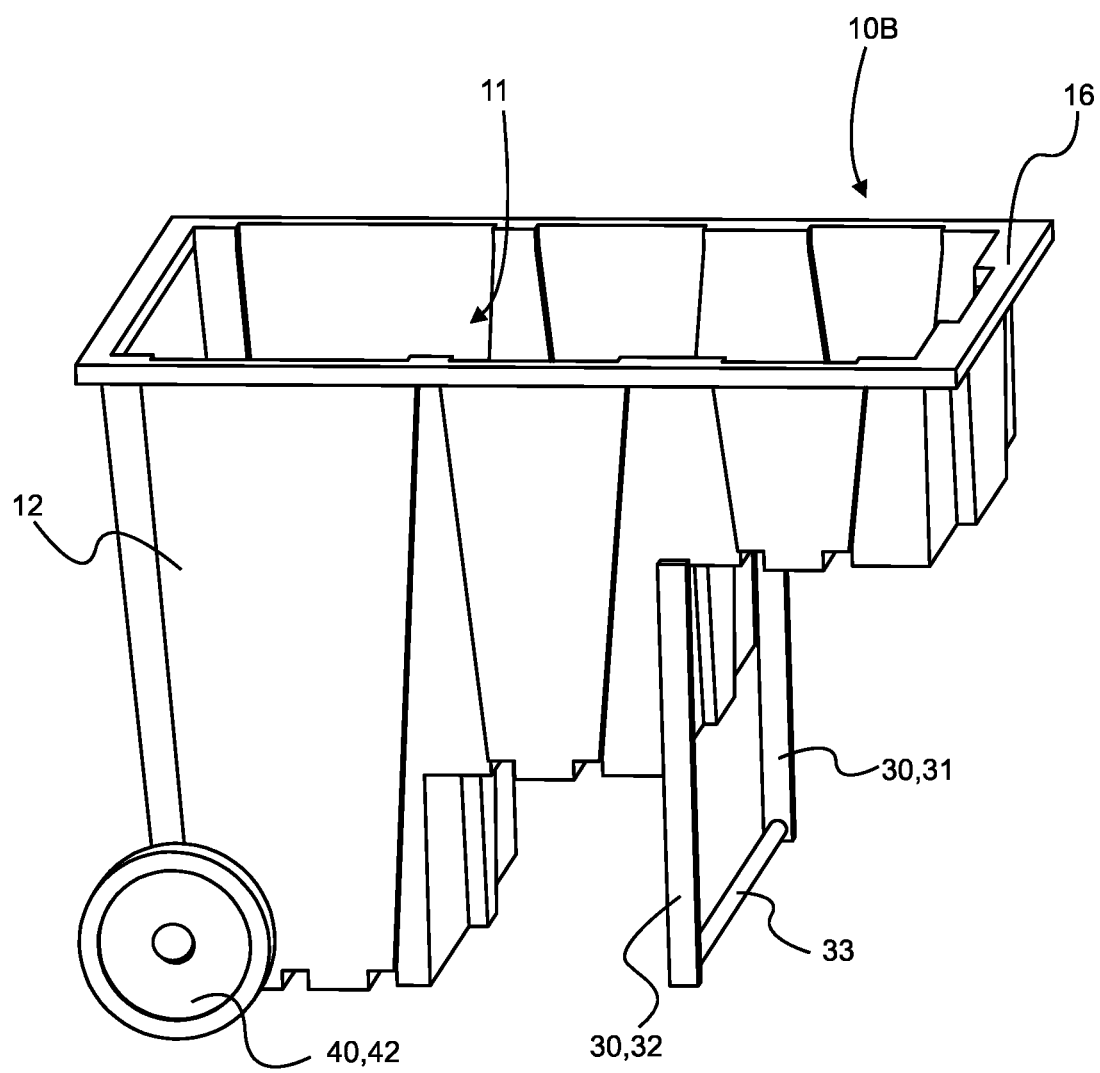
FIG. 3 is a perspective view of another exemplary embodiment of an upright muck bucket and reversible staircase according to select embodiments of the instant disclosure.
Figure 4:
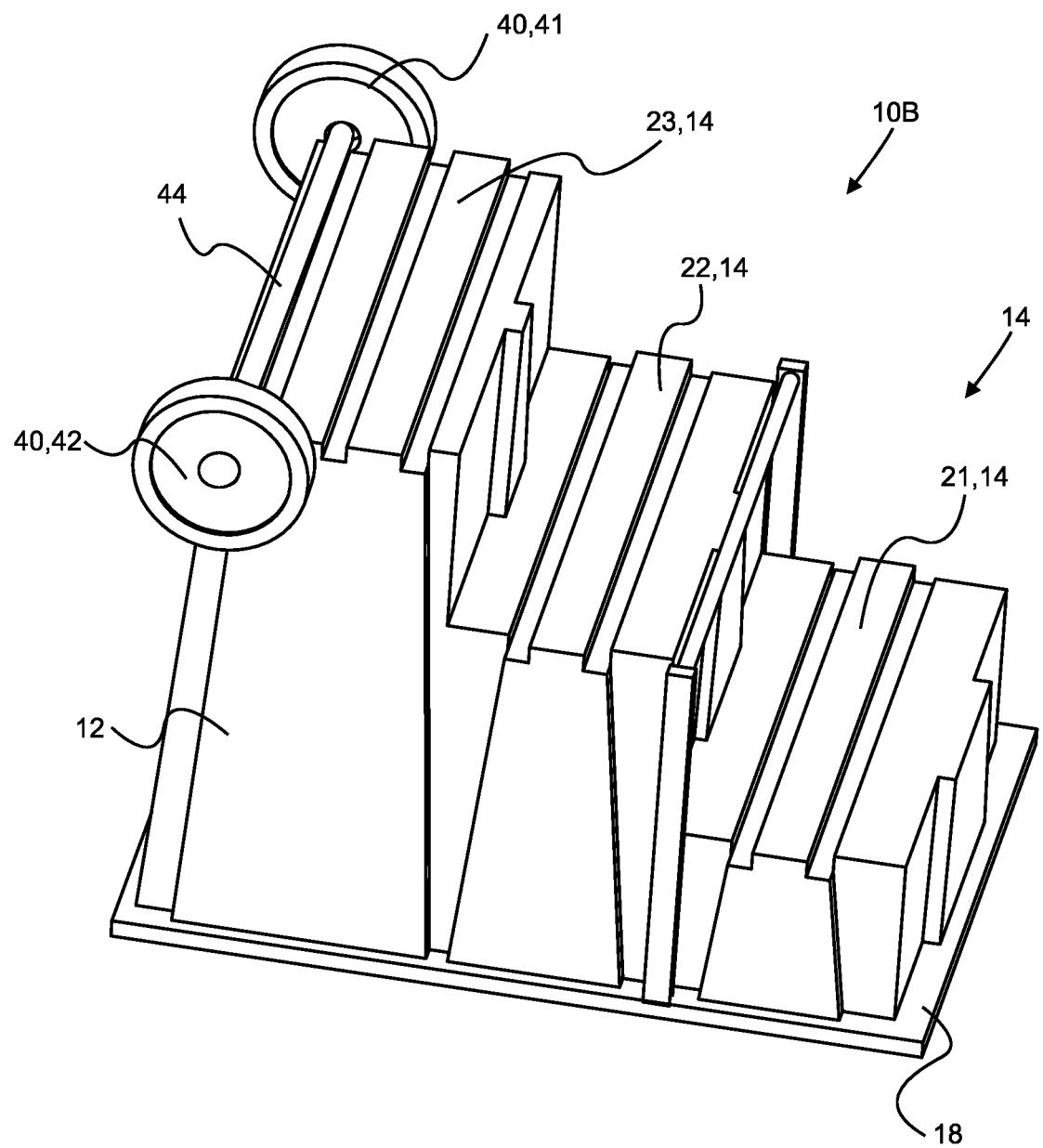
FIG. 4 is an perspective view of an exemplary embodiment of an inverted muck bucket and reversible staircase according to select embodiments of the instant disclosure in FIG. 3.
Figure 5A:
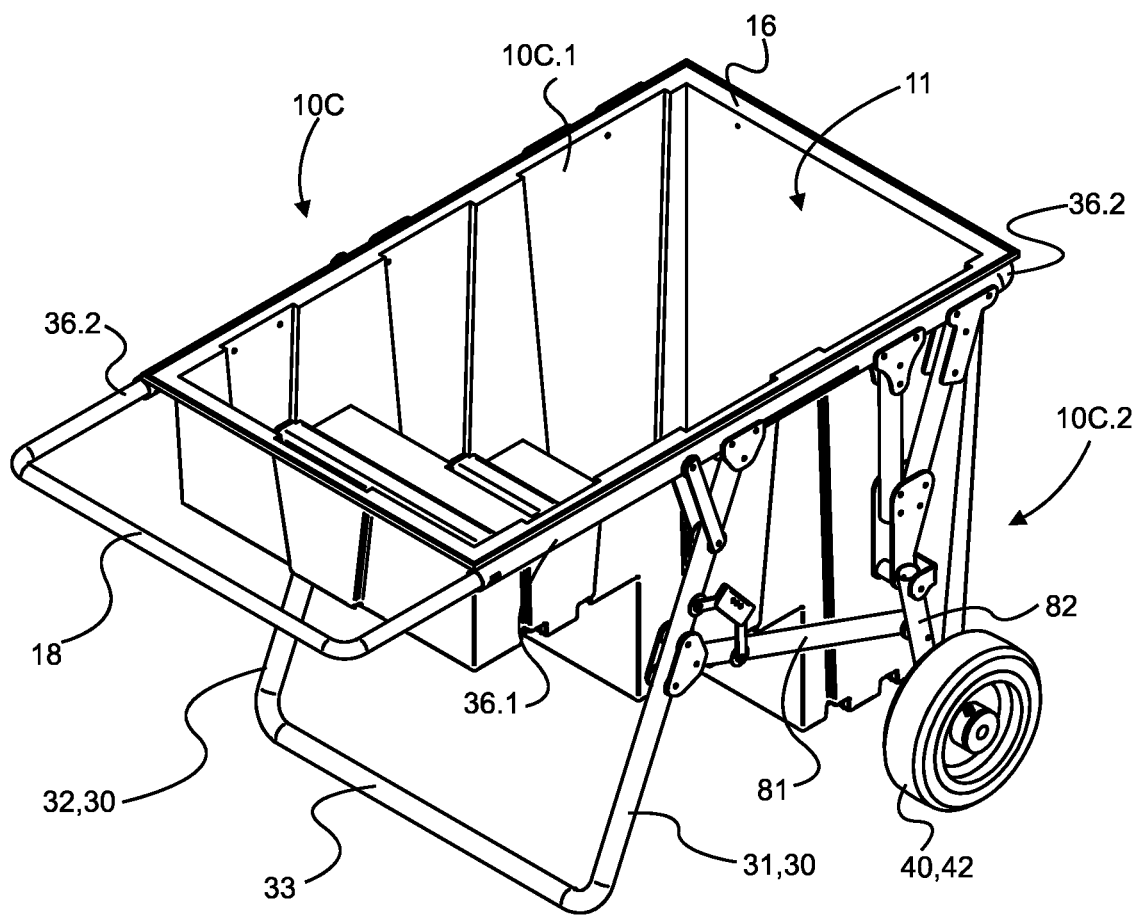
FIG. 5A is a perspective view of another exemplary embodiment of an upright position muck bucket and reversible staircase according to select embodiments of the instant disclosure.
Figure 5B:
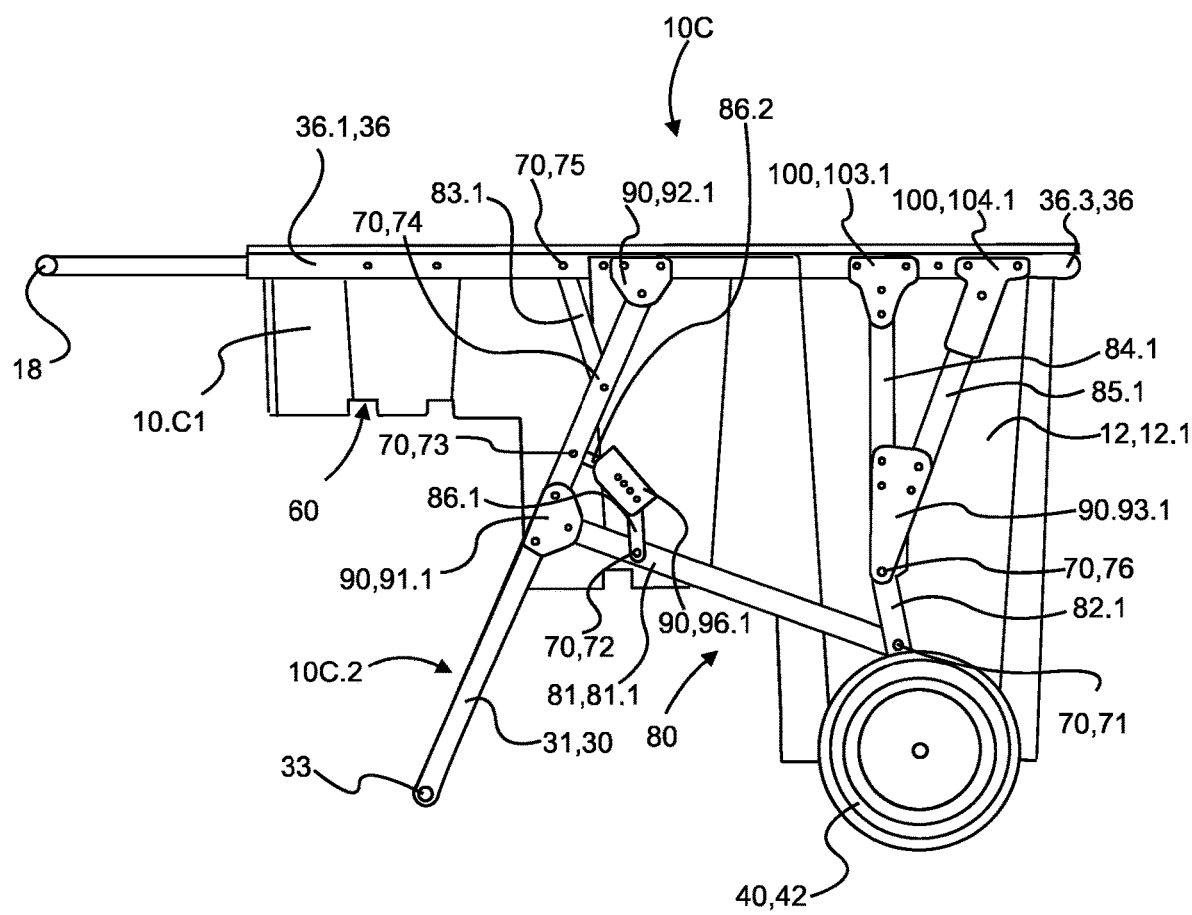
FIG. 5B is a side view of exemplary embodiment of an upright position muck bucket and reversible staircase according to select embodiments of the instant disclosure in FIG. 5A.

Moreover in FIGS. 3 and 4, muck bucket and reversible staircase 10B may include a brace or support, such as support legs 30 having first support leg 31 and second support leg 32 with a cross member 33 to support first support leg 31 and second support leg 32. Preferably, first support leg 31 and second support leg 32 may be affixed or slidably affixed to first sidewall 12.1, second sidewall 12.2 or second step 22 to support muck bucket and reversible staircase 10B while in an upright position to efficiently collect, transport, and remove muck and manure, or the like. It is contemplated herein that first support leg 31 and second support leg 32 may be affixed or slidably or rotationally or foldably affixed or fixed elsewhere on muck bucket and reversible staircase 10B, such as third step 23 or first sidewall 12.1, second sidewall 12.2.

Furthermore, muck bucket and reversible staircase 10B may include wheels 40, such as first wheel 41 and second wheel 42 to provide mobility for muck bucket and reversible staircase 10B, where first wheel 41 may be rotationally mounted to first sidewall 12.1 and second wheel 42 may be rotationally mounted to second sidewall 12.2. It is contemplated herein that first wheel 41 and second wheel 42 may be connected by axle 44, wherein axle 44 may be mounted to third step 23 and proximate third sidewall 12.3. It is contemplated herein that first wheel 41 and second wheel 42 may be pivotably mounted to first sidewall 12.1, second sidewall 12.2 proximate third step 23. In a preferred embodiment first wheel 41 and second wheel 42 may be mounted or positioned so as to be separated a distance from sidewall (such as by three (3) inches, such as first sidewall 12.1 and second wheel 42, respectively to provide a secure and safe staircase final step, third step 23 free from first wheel 41 and second wheel 42 to prevent user U from accidentally stepping on first wheel 41 and second wheel 42 when user U is standing on third step 23.

Returning again to FIG. 1 upright position and 2 inverted position, in an alternate or second embodiment, muck bucket and reversible staircase 10A may include sidewalls 12, such as first sidewall 12.1, second sidewall 12.2, third sidewall 12.3, and bottom 14 to be used to efficiently collect, transport, and remove muck and manure, or the like. Sidewalls 12 may include perimeter rim 16 therearound to form opening, such as aperture 11, wherein user U may deposit muck and manure, or the like for transport by muck bucket and reversible staircase 10B. It is contemplated herein that perimeter rim 16 may form substantially planar support surfaces which can be used for stability when muck bucket and reversible staircase 10 is in an inverted orientation. Bottom 14 may be configured with one or more steps formed therein, such as first step 21, second step 22, and third step 23 for use when muck bucket and reversible staircase 10 is inverted for use as a secure and safe staircase for a rider to mounting a riding animal. It is contemplated herein that first step 21, second step 22, and third step 23 may include tread or slip resistant surfacing, such as grooves 25. Handle 18 may be positioned proximate first step 21 and/or rim 16 to enable user U to steer or guide and push or pull muck bucket and reversible staircase 10B.

Moreover, muck bucket and reversible staircase 10A may include a brace or support, such as support legs 30 having first support leg 31 and second support leg 32 with a cross member 33 to support first support leg 31 and second support leg 32. Preferably, first support leg 31 and second support leg 32 may be affixed or pivotably or rotationally affixed or pivotably affixed to first sidewall 12.1, second sidewall 12.2, respectively via first pivot pin 70, 71, or a transition between second step 22 and third step 23 to support muck bucket and reversible staircase 10B while in an upright position to efficiently collect, transport, and remove muck and manure, or the like. It is contemplated herein that hinge plate assembly 90, 90.1, 90.2 may be pivotably affixed to first pivot pin 70, 71 or first sidewall 12.1, second sidewall 12.2, respectively, or a transition between second step 22 and third step 23 first sidewall 12A and second sidewall 12B where first hinge plate assembly 90.1 may be affixed to first support leg 31 and second hinge plate assembly 90.2 may be affixed to second leg 32 to enable rotational pivot between leg brace for upright muck bucket and reversible staircase 10B (FIG. 1) and retracted leg brace for inverted muck bucket and reversible staircase 10B (FIG. 2). It is contemplated herein that first support leg 31 and second support leg 32 may be affixed or slidably or rotationally or foldably affixed or fixed elsewhere on muck bucket and reversible staircase 10B, such as third step 23 or first sidewall 12.1, second sidewall 12.2.

Furthermore, muck bucket and reversible staircase 10B may include wheels 40, such as first wheel 41 and second wheel 42, where first wheel 41 may be rotationally mounted to first sidewall 12.1 and second wheel 42 may be rotationally mounted to second sidewall 12B via wheel support arm 82 pivotable P about sidewall 12 via second pivot pin 70, 72. Furthermore, wheel support arm 82 may travel in synch with hinge plate assembly 90 of support legs 30 via a linkage arm 81 connected to both hinge plate assembly 90 and wheel support arm 82 to enable rotational pivot P between support legs 30 having first support leg 31 and second support leg 32 in a down or brace position and wheels 40, such as first wheel 41 and second wheel 42 in an extended wheel position or engaged position (FIG. 1) for upright muck bucket, and alternatively reversible staircase 10, or support legs 30 having first support leg 31 and second support leg 32 in a up or retracted position and wheels 40, such as first wheel 41 and second wheel 42 in a retracted wheel position (FIG. 2) for inverted muck bucket and reversible staircase 10B, where wheels 40 may be positioned remote from the stepping surface, such as second step 22 and third step 23.

Figure 2:
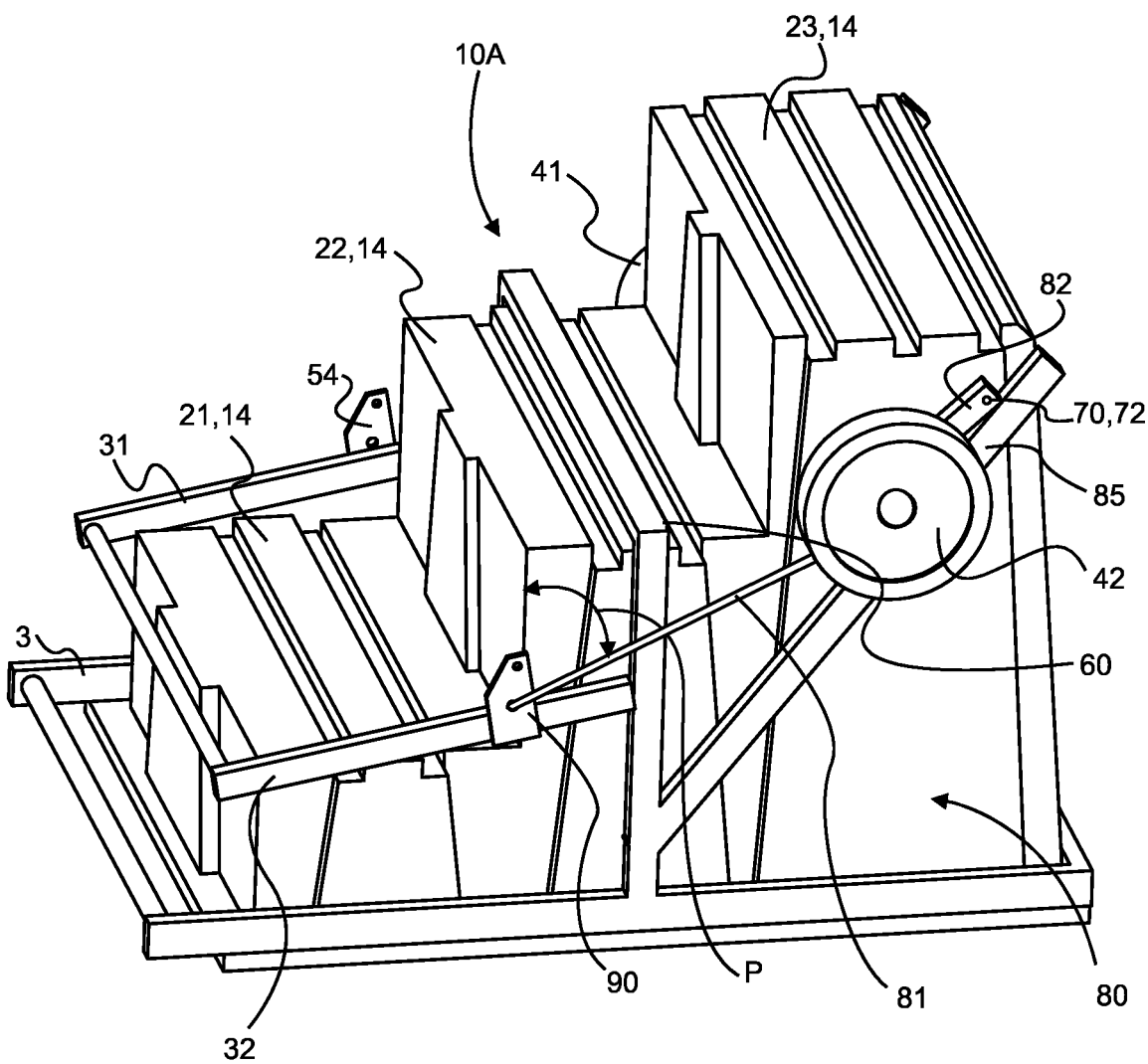
FIG. 2 is an perspective view of an exemplary embodiment of an inverted position muck bucket and reversible staircase according to select embodiments of the instant disclosure in FIG. 1.

It is contemplated herein that brace or support, such as support legs 30 may fold/unfold between unfolded support legs 30, brace or support position for upright muck bucket with wheels 40 down, extended wheel position, or in a travel position (FIG. 1) and folded support legs 30 position for inverted muck bucket to use as horse (riding animal) boarding steps with wheels 40 retracted wheel position or in a safe position for stair use (FIG. 1).

It is contemplated herein that support legs 30 having first support leg 31 and second support leg 32 and/or first wheel 41 and second wheel 42 may be pivotably mounted to first sidewall 12.1, second sidewall 12.2 proximate second step 22 or third step 23.

Referring now to FIGS. 5A, 5B, 6A, 6B, 7 and 8, by way of example, and not limitation, there is illustrated an example embodiment of muck bucket and reversible staircase 10C and its parts, according to select embodiments. In this embodiment, muck bucket and reversible staircase 10C may include sidewalls 12, such as first sidewall 12.1, second sidewall 12.2, third sidewall 12.3, and bottom 14 to be used to efficiently collect, transport, and remove muck and manure, or the like. Sidewalls 12 may include perimeter rim 16 therearound to form opening, such as aperture 11, wherein user U may deposit muck and manure, or the like for transport by muck bucket and reversible staircase 10C. Bottom 14 may be configured with one or more steps formed therein, such as first step 21, second step 22, and third step (last step) 23 for use when muck bucket and reversible staircase 10C is inverted for use as a secure and safe staircase for a rider to mounting a riding animal. It is contemplated herein that first step 21, second step 22, and third step 23 may include tread or slip resistant surfacing, such as grooves 25. Handle 18 may be positioned proximate first step 21 and/or rim 16 to enable user U to steer or guide and push or pull muck bucket and reversible staircase 10.

Referring again to FIGS. 5A, 5B and 7, by way of example, and not limitation, there is illustrated an example embodiment of muck bucket and reversible staircase 10C and its parts, according to select embodiments, shown in a roller or transport mode with wheels 40 extended or unfolded. Moreover, muck bucket and reversible staircase 10C may include muck bucket and reversible staircase 10C.1 (FIG. 8) and a cart or framed wheel assembly 10C.2 (FIG. 7). A cart or framed wheel assembly 10C.2 may include horizontal perimeter frame 36 having first frame segment 36.1, second frame segment 36.2, and third frame segment 36.3 configured to form a u-shape when assembled and to function as a catch for rim 16 to muck bucket and reversible staircase 10C.1 above the ground and enable cross ground travel via handle 18 connected to horizontal perimeter frame 36. It is contemplated herein that first frame segment 36.1, second frame segment 36.2, and third frame segment 36.3 may be affixed, or removeably affixed to form horizontal perimeter frame 36 and may be formed in any configuration to affix to muck bucket and reversible staircase 10C.1. Moreover, framed wheel assembly 10C.2 may include a brace or support, such as support legs 30 having first support leg 31 and second support leg 32 with a cross member 33 to support first support leg 31 and second support leg 32, where first support leg 31 may be pivotably or hingeably connected to midsection of first support leg 31 via one or more hinge plate assembly 90, such as second hinge plate assembly 92 (92.1 and 92.2); and a midsection of second support leg 32 may be pivotably or hingeably connected to midsection of second support leg 32 via one or more hinge plate assembly 90, such as second hinge plate assembly 92 (92.3 and 92.4). It is contemplated herein that brace or support, such as support legs 30 may fold/unfold between unfolded, brace, travel, or support position for upright muck bucket (FIG. 5A) and folded position for inverted muck bucket to use as horse (riding animal) boarding steps (FIG. 6B).

Figure 6A:
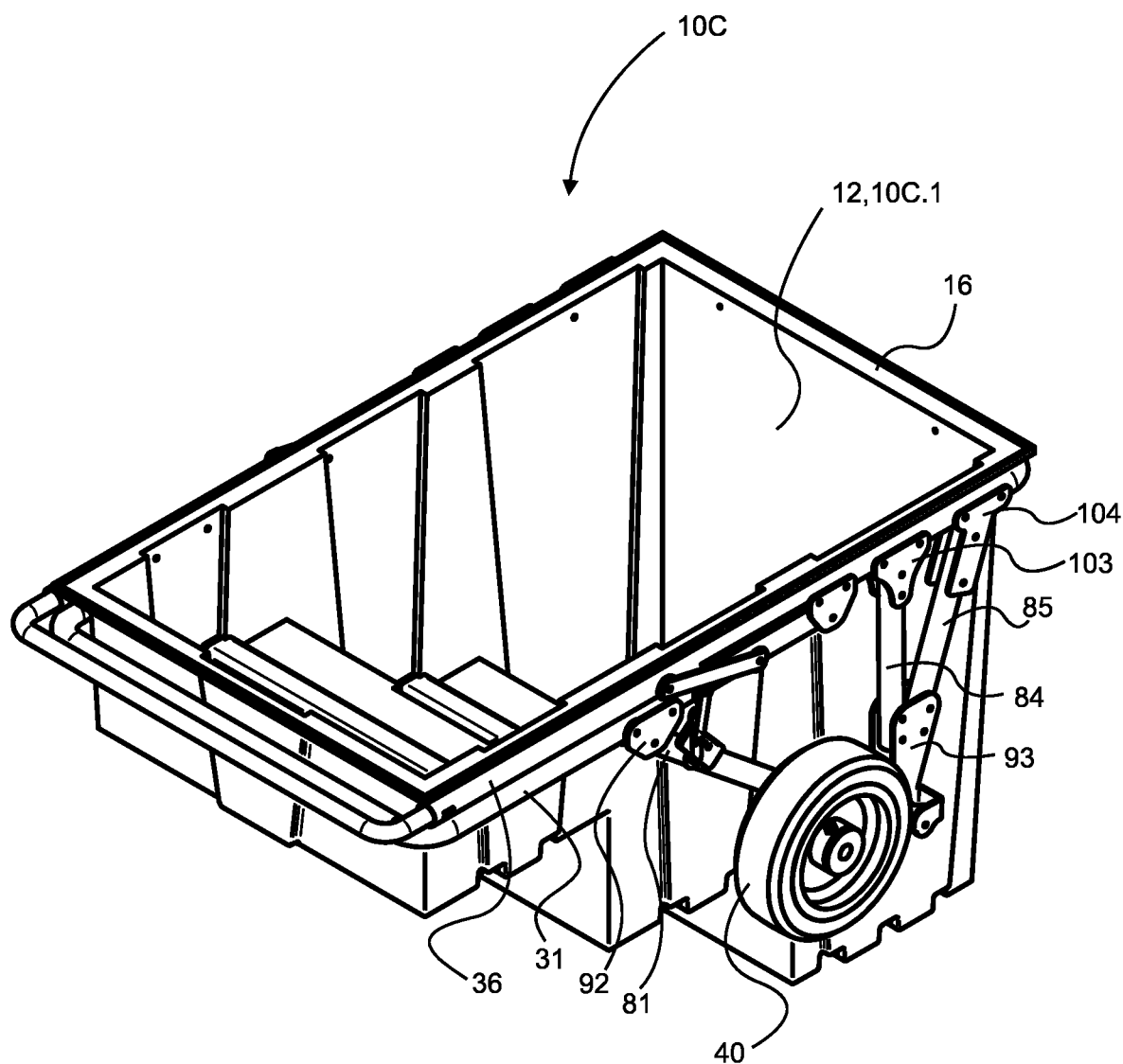
FIG. 6A is an perspective view of an upright position muck bucket according to select embodiments of the instant disclosure in FIG. 5.
Figure 6B:
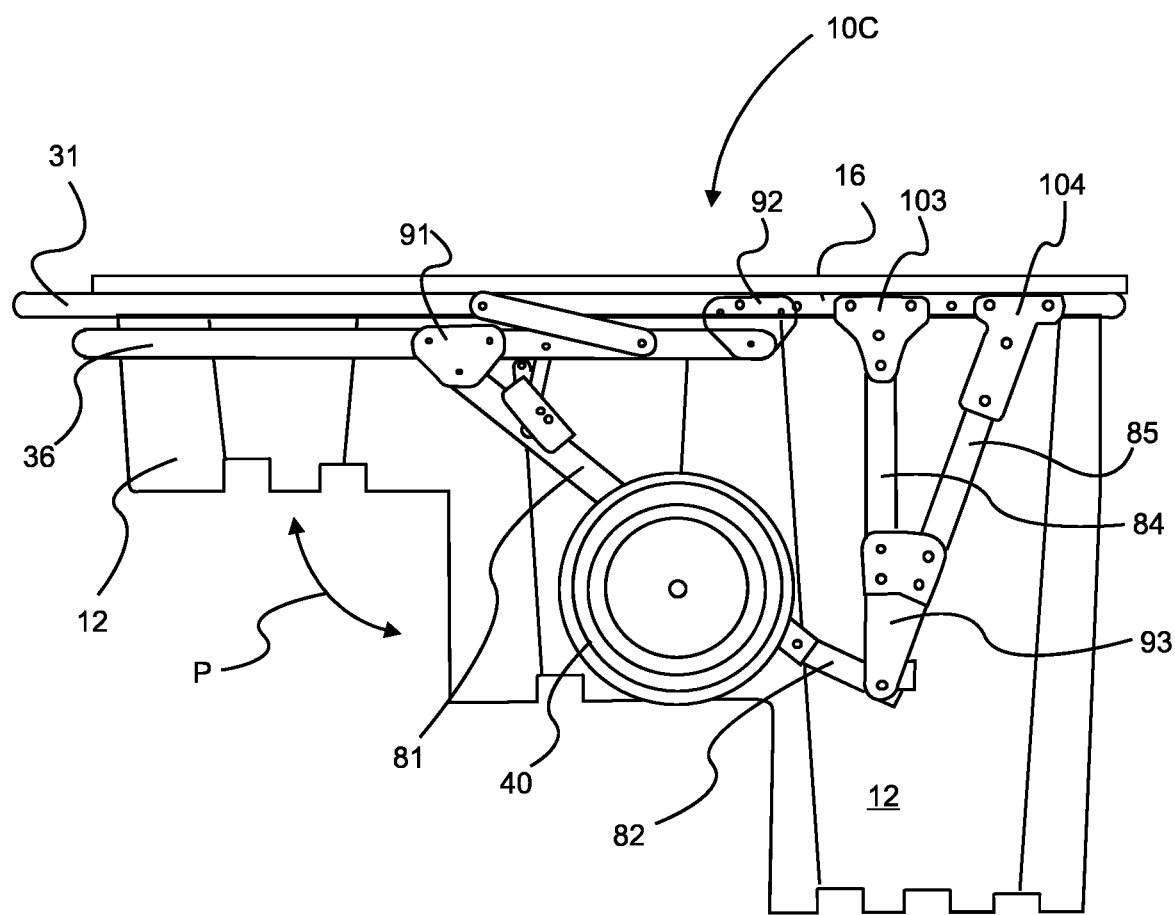
FIG. 6B is a side view of an upright position muck bucket according to select embodiments of the instant disclosure in FIG. 5.
Figure 7:
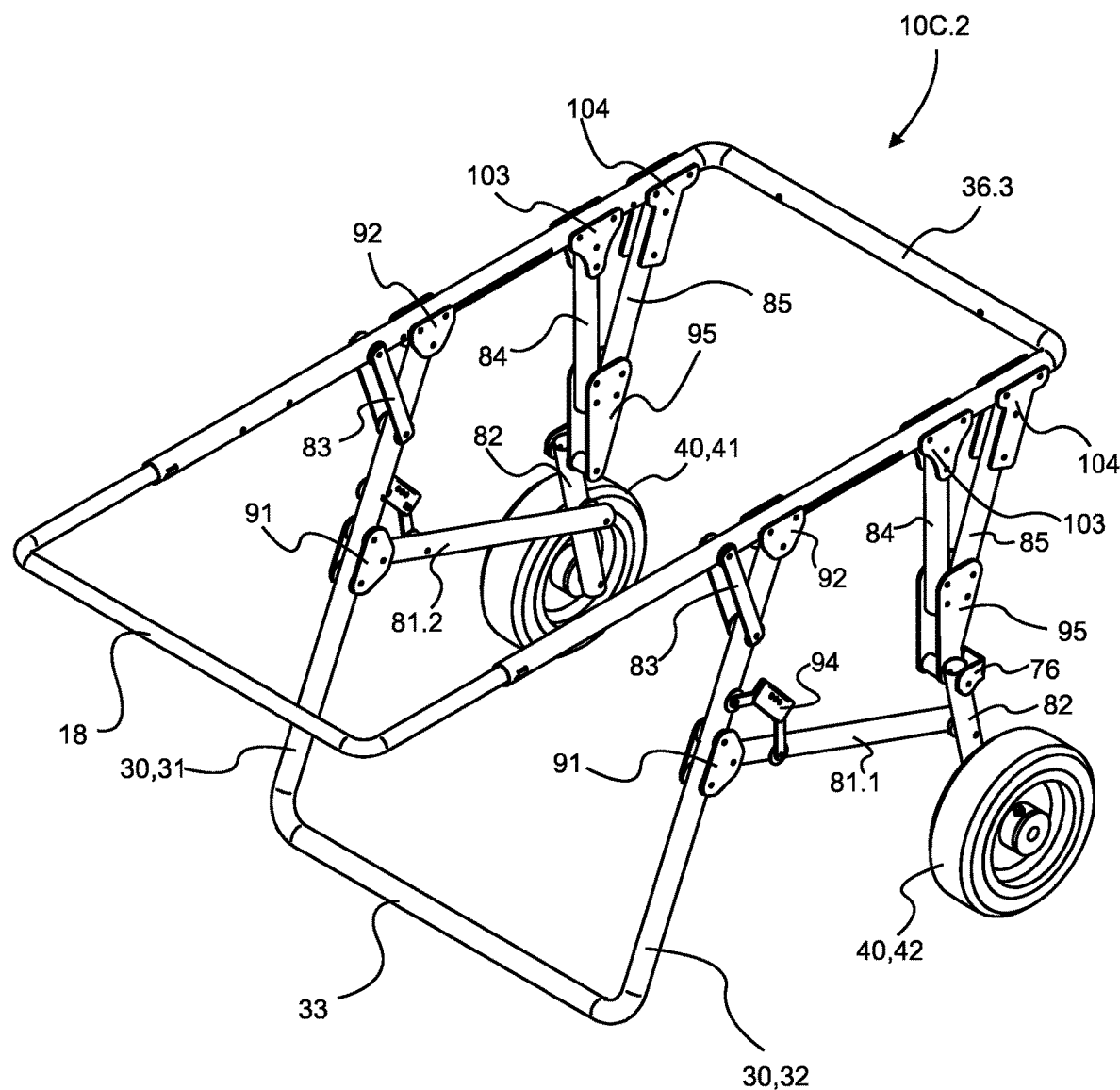
FIG. 7 is an perspective view of an upright position support and transport structure according to select embodiments of the instant disclosure in FIG. 5.

It is contemplated herein that brace or support, such as support legs 30 may fold/unfold between unfolded support legs 30, brace or support position for upright muck bucket with wheels 40 down, extended wheel position, or in a travel position (FIG. 5A) and folded support legs 30 position for inverted muck bucket to use as horse (riding animal) boarding steps with wheels 40 retracted wheel position or in a safe position for stair use (FIG. 6B).

First frame segment 36.1 may be supported by extension/retraction system 80 having hinged linkages, such as linkage arm 81, 81.1 and wheel support arm 82, 82.1 where first end of linkage arm 81, 81.1 may be pivotably or hingeably connected to midsection of first frame segment 36.1 via one or more hinge plate assembly 90, such as first hinge plate assembly 91 (91.1 and 91.2) and second end of linkage arm 81, 81.2 is pivotably or hingeably connected to a midsection of wheel support arm 82, 82.1 via first pivot pin 70, 71.

Moreover, first hinge plate assembly 91 may be supported by fourth hinge plate assembly 90, 94.1 with pivotably or hingedly linkages in series, such as second linkage 86, (86.1) where second end of second linkage 86.1 may be pivotably or hingeably connected to midsection of linkage arm 81 via second pivot pin 70, 72 and second end of second linkage 86.1 may be pivotably or hingeably connected to third hinge plate assembly 93, 93.1 and third linkage 86, (86.2) where second end of third linkage 86.2 may be pivotably or hingeably connected to midsection of first support leg 31 via third pivot pin 70, 73 and second end of third linkage 86.2 may be pivotably or hingeably connected to third hinge plate assembly 93, 93.1.

Furthermore, second hinge plate assembly 92 may be supported by pivotably or hingedly linkages, such as first linkage 83, (83.1) where first end of first linkage 83, (83.1) may be pivotably or hingeably connected to midsection of first frame segment 36.1 via fifth pivot pin 70, 75 and second end of first linkage 83, (83.1) may be pivotably or hingeably connected to midsection of first support leg 31 between first hinge plate assembly 91.1 and second hinge plate assembly 92.1 via fourth pivot pin 70, 74.

Furthermore, muck bucket and reversible staircase 10C may include wheels 40, such as first wheel 41 and second wheel 42, where first wheel 41 may be rotationally mounted to first end of wheel support arm 82, 82.1 and second wheel 42 may be rotationally mounted first end of wheel support arm 82, 82.2. Opposite, other, or second end of wheel support arm 82, 82.1 may be pivotably or hingeably connected to first sidewall 12.1 proximate third step 23 via seventh pivot pin 70, 76 and second end of wheel support arm 82, 82.2 may be pivotably or hingeably connected to second sidewall 12.2 proximate third step 23 via seventh pivot pin 70, 76. It is contemplated herein that seventh pivot pin 70, 76 enables fold/unfold of wheels 40 between unfolded or transport position for upright muck bucket and wheels 40 down and folded wheels 40 up position for inverted muck bucket to use as horse (riding animal) boarding steps.

One or more, or at least one vertical support or extension may be positioned between seventh pivot pin 70, 76 and horizontal perimeter frame 36, such as first vertical extension 84, 84.1, 84.2 and second vertical extension 85, 85.1, 85.2 to extend seventh pivot pin 70, 76 proximate third step 23, where first end of first vertical extension 84, 84.1, 84.2 and second vertical extension 85, 85.1, 85.2 may be connected to horizontal perimeter frame 36 by third bracket assembly 100, 103.1, 103.2 and fourth bracket assembly 104, 104.1, 104.2, respectively. Opposite, other or second end of first vertical extension 84, 84.1, 84.2 and second vertical extension 85, 85.1, 85.2 may be connected to third hinge plate assembly 93, 93.1, 93.2.

Furthermore, extension/retraction system 80 may travel in synch with wheels 40 may via first support leg 31 and second support leg 32, linkage arm 81, 81.1, and wheel support arm 82, 82.1 to enable rotational pivot P of first support leg 31 and second support leg 32 in a down or brace position and wheels 40, such as first wheel 41 and second wheel 42 in an extended or unfolded position (FIGS. 5A and 5B) for upright muck bucket and reversible staircase 10C, or first support leg 31 and second support leg 32 in a retracted or folded position and wheels 40, such as first wheel 41 and second wheel 42 in a retracted or folded position (FIGS. 6A and 6B) for inverted muck bucket and reversible staircase 10C to use as horse (riding animal) boarding steps.

Referring now to FIGS. 6A and 6B, by way of example, and not limitation, there is illustrated an example embodiment of muck bucket and reversible staircase 10C and its parts, according to select embodiments, shown with wheels 40 retracted or folded. Support legs 30 having first support leg 31 and second support leg 32 with a cross member 33 may be hinged or pivoted in pivot P direction, which results in movement of linkage arm 81, 81.1, and wheel support arm 82, 82.1, causing wheel support arm 82, 82.1, 82.2 to pivot or rotate about seventh pivot pin 70, 76, and lift, retract, or fold wheels 40, such as first wheel 41 and second wheel 42 from a down, engaged, unfolded position shown in FIGS. 5A and 5B to retracted or folded position and wheels 40, such as first wheel 41 and second wheel 42 in a retracted or folded position shown in FIGS. 6A and 6B.

Referring now to FIG. 7, by way of example, and not limitation, there is illustrated an example embodiment of framed wheel assembly 10C.2 and its parts, according to select embodiments of extension/retraction system 80, shown with wheels 40 extended or unfolded. Horizontal perimeter frame 36 having first frame segment 36.1, second frame segment 36.2, and third frame segment 36.3 and handle 18 configured to form a u-shape, square, or rectangle when assembled form perimeter frame and function as a catch for rim 16 to maintain muck bucket and reversible staircase 10C.1 above or elevated above the ground and enable cross ground travel via handle 18 connected to horizontal perimeter frame 36.

Figure 8:
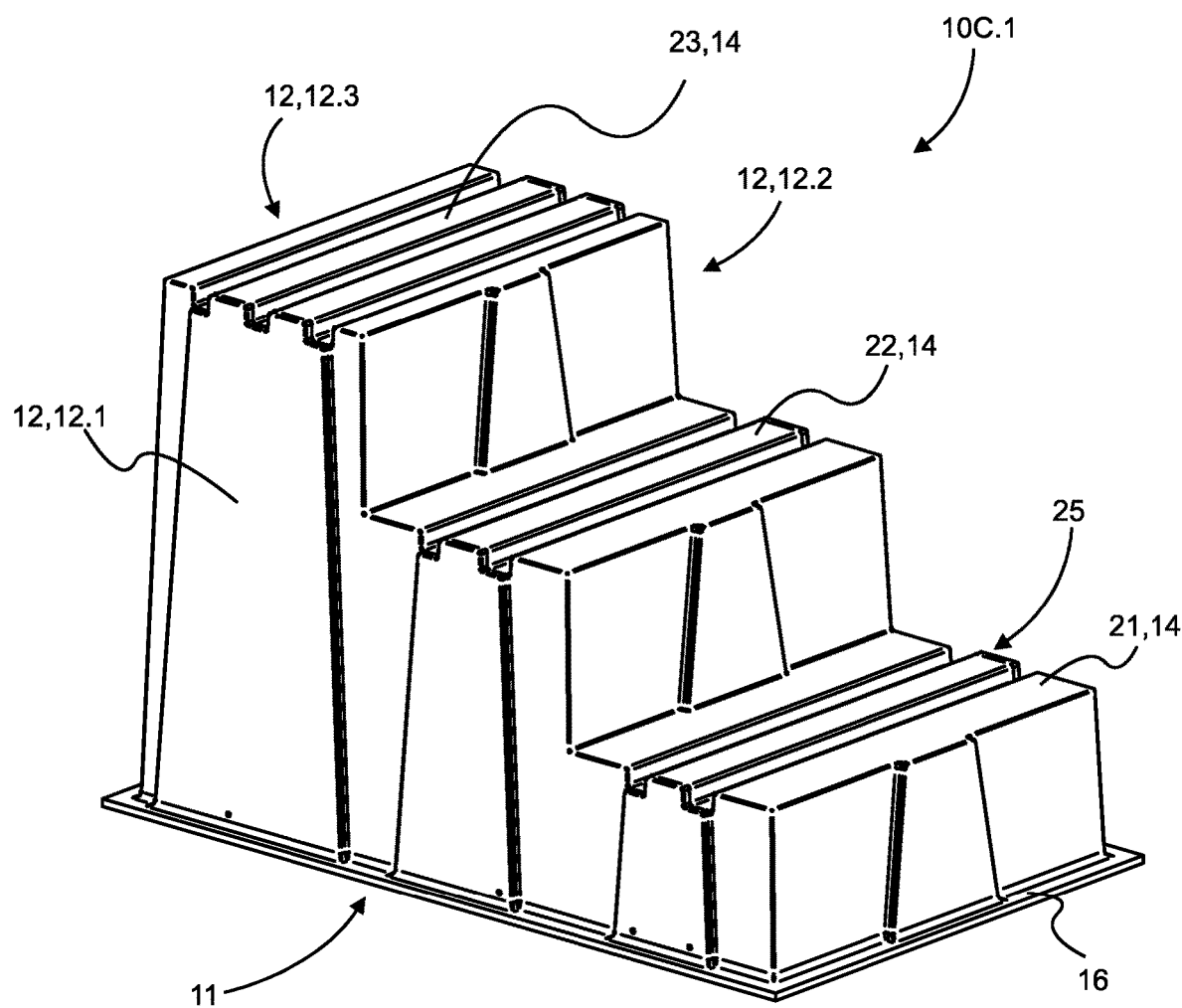
FIG. 8 is an perspective view of an inverted position muck bucket according to select embodiments of the instant disclosure in FIG. 5.

Referring now to FIG. 8, by way of example, and not limitation, there is illustrated an example embodiment of muck bucket and reversible staircase 10 and its parts, according to select embodiments. In this first embodiment, muck bucket and reversible staircase 10 may include sidewalls 12, such as first sidewall 12.1, second sidewall 12.2, third sidewall 12.3, and bottom 14 to be used to efficiently collect, transport, and remove muck and manure, or the like. Sidewalls 12 may include perimeter rim 16 therearound to form opening, such as aperture 11, wherein user U may deposit muck and manure, or the like for transport by muck bucket and reversible staircase 10. Bottom 14 may be configured with one or more steps formed therein, such as first step 21, second step 22, and third step 23 for use when muck bucket and reversible staircase 10 is inverted for use as a secure and safe staircase for a rider to mounting a riding animal. It is contemplated herein that first step 21, second step 22, and third step 23 may include tread or slip resistant surfacing, such as grooves 25. Handle 18 may be positioned proximate first step 21 and/or rim 16 to enable user U to steer or guide and push or pull muck bucket and reversible staircase 10.

It is contemplated herein that framed wheel assembly 10C.2 may be configured from round or square tubing, angle iron, other tube, or like elongated supports structures constructed to support and connect framed wheel assembly 10C.2.

It is further contemplated herein that other and all possible construction materials are contemplated herein for framed wheel assembly 10C.2.

With respect to the description herein, it is to be realized that the optimum dimensional relationships, to include variations in size, materials, shape, form, position, connection, function and manner of operation, assembly and use, are intended to be encompassed by the present disclosure.

It is contemplated herein that muck bucket and reversible staircase 10C.1 components may be constructed of plastic, structural foam, polypropylene, canvas, steel, stainless steel, aluminum, or the like materials and of different dimensions. This and other materials herein may be constructed of metal, steel, alloy, or plastic or more specifically high density polyethylene or similar high tensile or strengthened materials, as these material offers a variety of forms and shapes and provide strength with reduced weight; however, other suitable materials or the like, can be utilized, provided such material has sufficient strength and/or durability as would meet the purpose described herein to enable muck bucket and reversible staircase 10C to meet construction and specifications. It is understood herein that various changes in the material used, shape, size, arrangement of parts, and parts are connected with bolts, pins, screws or similar fasteners or other rotating devices without departing from the spirit of the scope of the claims herein.

It is further understood herein that the parts and elements of this disclosure may be located or position elsewhere based on one of ordinary skill in the art without deviating from the present disclosure.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A combination apparatus for use as a cart and a staircase, said apparatus comprising:
   a load carrying container having and open top formed from sidewalls, a back wall and a bottom, said bottom configured as a plurality of steps;
   a pair of legs, each said pair of legs pivotably affixed to said sidewalls to support said container in an upright position;
   a pair of wheels, each of said pair of wheels pivotably affixed to said sidewalls to transport said container in an upright position, said pair of wheels connected to said pair of legs by a linkage arm, and
   wherein a pivot motion of said pair of legs moves said pair of wheels between an extended wheel position and a retracted wheel position.

2. The apparatus of claim 1, wherein said sidewalls and said back wall further comprising a perimeter rim to form a planar support surface.

3. The apparatus of claim 1, wherein said plurality of steps further comprises a slip resistant surface.

4. The apparatus of claim 3, wherein said sidewalls further comprises a handle positioned proximate said first step to guide said container.

5. The apparatus of claim 1, wherein said pair of legs further comprises a cross member to support said pair of legs.

6. The apparatus of claim 1, wherein each said pair of legs further comprises a first pivot pin to pivotably affix said pair of legs to said sidewalls.

7. The apparatus of claim 6, wherein said first pivot pin further comprises a first hinge plate.

8. The apparatus of claim 7, wherein said pair of wheels further comprises a wheel support arm to pivotably affix each said pair of wheels to said sidewalls.

9. The apparatus of claim 8, wherein said wheel support arm further comprises a second pivot pin to pivotably affix said wheel support arm to said sidewalls.

10. The apparatus of claim 9, wherein said linkage arm is connected to a first hinge plate and said wheel support arm.

11. A combination apparatus for use to transport material and a staircase, said apparatus comprising:
    a load carrying container having and open top formed from sidewalls, a back wall and a bottom, said bottom configured as a plurality of steps;
    a cart, said cart having horizontal perimeter frame, a pair of legs, each said pair of legs pivotably affixed to one side of said horizontal perimeter frame, a pair of wheels, each of said pair of wheels affixed to a wheel support arm, said wheel support arm pivotably affixed to said horizontal perimeter frame via a pivot pin, and an linkage arm connected to proximate a midsection of each of said pair of legs and proximate a midsection of said wheel support arm; and
    wherein a pivot motion of said pair of legs moves said linkage arm and said wheel support arm to move said pair of wheels between an extended wheel position and a retracted wheel position.

12. The apparatus of claim 11, wherein said sidewalls and said back wall further comprising a perimeter rim to support said container on said perimeter frame.

13. The apparatus of claim 11, wherein said plurality of steps further comprises a slip resistant surface.

14. The apparatus of claim 11, wherein said horizontal perimeter frame further comprises a handle positioned proximate a first step of said plurality of steps, wherein said pair of legs further comprises a cross member to support said pair of legs.

15. The apparatus of claim 11, wherein each said pair of legs further comprises a first hinge plate to pivotably affix said linkage arm to said each said pair of legs.

16. The apparatus of claim 11, wherein each said pair of legs further comprises a second hinge plate to pivotably affix each said pair of legs to said perimeter frame.

17. The apparatus of claim 16, wherein said second hinge plate further comprises a first linkage between said perimeter frame and each said pair of legs.

18. The apparatus of claim 16, wherein said wheel support arm further comprises at least one vertical extension to extend said pivot pin proximate a last step of said plurality of steps.

19. The apparatus of claim 18, wherein each said at least one vertical extension further comprises a third hinge plate to support said pivot pin.

20. The apparatus of claim 18, wherein said at least one vertical extension further comprises a bracket assembly to affix said at least one vertical extension to said perimeter frame.

21. The apparatus of claim 16, wherein said first hinge further comprises a second linkage and a third linkage in series between said linkage arm and each said pair of legs.

* * * * *